US012544659B2

(12) United States Patent
Morimura et al.

(10) Patent No.: US 12,544,659 B2
(45) Date of Patent: Feb. 10, 2026

(54) NON-TRANSITORY COMPUTER-READABLE STORAGE MEDIUM WITH EXECUTABLE INFORMATION PROCESSING PROGRAM STORED THEREON, GAME SYSTEM, GAME DEVICE, AND INFORMATION PROCESSING METHOD

(71) Applicant: NINTENDO CO., LTD., Kyoto (JP)

(72) Inventors: Naoya Morimura, Kyoto (JP); Arthur Denardou, Paris (FR); Lukasz Fronc, Paris (FR); Emeric Pascual, Paris (FR)

(73) Assignee: NINTENDO CO., LTD., Kyoto (JP)

( * ) Notice: Subject to any disclaimer, the term of this patent is extended or adjusted under 35 U.S.C. 154(b) by 271 days.

(21) Appl. No.: 18/209,581

(22) Filed: Jun. 14, 2023

(65) Prior Publication Data

US 2024/0165505 A1 May 23, 2024

(30) Foreign Application Priority Data

Nov. 18, 2022 (JP) ................................ 2022-184964

(51) Int. Cl.
*A63F 13/31* (2014.01)
*A63F 13/49* (2014.01)
*A63F 13/847* (2014.01)

(52) U.S. Cl.
CPC .............. *A63F 13/31* (2014.09); *A63F 13/49* (2014.09); *A63F 13/847* (2014.09)

(58) Field of Classification Search
CPC ........ A63F 13/20; A63F 13/31; A63F 13/323; A63F 13/40; A63F 13/45; A63F 13/50; A63F 13/52; A63F 13/53; A63F 13/55; A63F 13/49; A63F 13/70; A63F 13/79; A63F 13/847; A63F 13/85;
(Continued)

(56) References Cited

U.S. PATENT DOCUMENTS

2006/0154710 A1 7/2006 Serafat
2019/0282895 A1* 9/2019 Choudhary ............ A63F 13/86
(Continued)

FOREIGN PATENT DOCUMENTS

JP 2003071137 A 3/2003
JP 2006509548 A 3/2006
(Continued)

*Primary Examiner* — Omkar A Deodhar
(74) *Attorney, Agent, or Firm* — Scully, Scott, Murphy & Presser, P.C.

(57) ABSTRACT

An information processing program causes a computer of an information processing apparatus to communicate with another information processing apparatus, to execute a game program adapted to multi-person play with a first emulator based on an operation input, to transmit data on the operation input to the another information processing apparatus, to output to a display, an image of a game executed with the first emulator, to obtain data on an operation input provided by another player from the another information processing apparatus, to execute the game program with a second emulator based on the obtained operation input by the another player, and to proceed with multi-person play of a game by transmission and reception between the first emulator and the second emulator, of data defined as data to be transmitted and received in multi-person play of the game program.

21 Claims, 16 Drawing Sheets

(58) Field of Classification Search
CPC .......... A63F 2300/30; A63F 2300/5533; A63F 2300/5546; A63F 2300/57
See application file for complete search history.

(56) References Cited

U.S. PATENT DOCUMENTS

| | | | | |
|---|---|---|---|---|
| 2021/0056603 | A1* | 2/2021 | Vidal | A63F 13/87 |
| 2021/0228990 | A1* | 7/2021 | Yoo | A63F 13/35 |
| 2023/0019749 | A1* | 1/2023 | Lin | A63F 13/5372 |
| 2024/0331493 | A1* | 10/2024 | Römer | G07F 17/3227 |

FOREIGN PATENT DOCUMENTS

| | | | |
|---|---|---|---|
| JP | 2010227455 | A | 10/2010 |
| JP | 2012125451 | A | 7/2012 |
| JP | 2022055500 | A | 4/2022 |

* cited by examiner

FIG.8

150-1

| 152 | 154 |
|---|---|
| 205 | A BUTTON |
| 301 | UP BUTTON |
| 381 | B BUTTON |
| ... | ... |

150-2

| 152 | 154 |
|---|---|
| 105 | B BUTTON |
| 221 | UP BUTTON |
| 481 | LEFT BUTTON |
| ... | ... |

150-3

| 152 | 154 |
|---|---|
| 007 | A BUTTON |
| 148 | B BUTTON |
| 418 | DOWN BUTTON |
| ... | ... |

150-4

| 152 | 154 |
|---|---|
| 052 | UP BUTTON |
| 140 | RIGHT BUTTON |
| 420 | B BUTTON |
| ... | ... |

NON-TRANSITORY COMPUTER-READABLE STORAGE MEDIUM WITH EXECUTABLE INFORMATION PROCESSING PROGRAM STORED THEREON, GAME SYSTEM, GAME DEVICE, AND INFORMATION PROCESSING METHOD

This non-provisional application is based on Japanese Patent Application No. 2022-184964 filed on Nov. 18, 2022 with the Japan Patent Office, the entire contents of which are hereby incorporated by reference.

FIELD

The present disclosure relates to an information processing program, a game system, a game device, and an information processing method.

BACKGROUND AND SUMMARY

In implementing multi-person play in a previous portable game console, a method of connecting portable game consoles to each other through a physical communication cable has been adopted in some cases. In such a communication game system, an operation to physically connect game consoles through a communication cable is substantially synonymous to participation of players in a game.

It is assumed that a game program executed in a conventional portable game console as described above is created on the premise that connection through a physical communication cable is established. Therefore, in an attempt to execute the game program with an emulator and to implement multi-person play over a network, an unexpected operation may occur. For example, participation/leave of a player corresponds to insertion and removal of a communication cable from a point of view of the game program, and participation/leave of a player at any timing during a game may cause an unexpected operation such as forced termination depending on specifications of the game program.

The present disclosure provides a scheme to suppress an unexpected operation such as forced termination even on the occurrence of cut-off of communication in implementation of multi-person play of a game program through communication.

(Configuration 1) An exemplary embodiment provides an information processing program that causes a computer of an information processing apparatus to perform communicating with another information processing apparatus, executing a game program adapted to multi-person play with a first emulator based on an operation input, transmitting data on the operation input to the another information processing apparatus, outputting to a display, an image of a game executed with the first emulator, to obtain data on an operation input provided by another player from the another information processing apparatus, executing the game program with a second emulator based on the obtained operation input by the another player, and proceeding with multi-person play of the game by transmission and reception between the first emulator and the second emulator, of data defined as data to be transmitted and received in multi-person play of the game program.

According to Configuration 1, in execution with the emulator, of a game program for which data to be transmitted and received in multi-person play is defined, the defined data is transmitted and received not between/among the plurality of information processing apparatuses but between/among emulators generated in a single information processing apparatus. By adoption of such transmission and reception of data between/among the emulators, even on the occurrence of cut-off of communication with another information processing apparatus, processing can continue with operation information or the like being regarded as being absent, and hence execution of the game program is not forcibly terminated. Thus, even on the occurrence of cut-off of communication or the like, an unexpected operation such as forced termination can be suppressed. Since processing as described above is performed with the emulator generated in the information processing apparatus, the game program itself does not have to be modified.

(Configuration 2) In Configuration 1, when the another information processing apparatus issues a request for participation of the another player in the multi-person play, the information processing program may cause the computer to perform allowing a state that the another player has not participated in the multi-person play to continue while the game program is being executed and allowing the another player to participate in the multi-person play and proceeding with multi-person play based on the first emulator and the second emulator when transition to a scene where execution of the game program with the first emulator is started is made. During the multi-person play, the information processing program may cause the computer to perform temporarily suspending the game when an instruction to quit the game is given or when a request to quit the game is given from another player based on communication and terminating the game program when an instruction to quit the game is given from information processing apparatuses of all players who participate in the multi-person play.

According to Configuration 2, even when a game program (in the past) for which connection to/disconnection from another information processing apparatus during progress of multi-person play has not been assumed is executed with the emulator, multi-person play can normally be started and terminated while the game program itself remains the same without being modified.

(Configuration 3) In Configuration 1 or 2, the game program adapted to the multi-person play may be at least one of a plurality of game programs adapted to multi-person play, and the scene where execution of the game program with the first emulator is started may be a scene where selection as to which of the plurality of game programs is to be started is made.

According to Configuration 3, since the first emulator can be generated in the scene where the game program for play in multi-person play is selected, processing necessary for multi-person play can be performed in advance.

(Configuration 4) In any of Configurations 1 to 3, when the instruction to quit the game is given from the information processing apparatuses of all players who participate in the multi-person play and the game program is terminated, the information processing program may cause the computer to perform making transition to the scene where selection as to which of the plurality of game programs is to be started is made.

According to Configuration 4, even after the game program with which multi-person play is made is terminated, when multi-person play by the same players is desired again, the game program with which multi-person play is made can be selected by performing few operations.

(Configuration 5) In any of Configurations 1 to 4, when the instruction to quit the game is given from the information processing apparatuses of all players who participate in the multi-person play and the game program is terminated, the information processing program may cause the computer to perform making transition to the scene where selection as to which of the plurality of game programs is to be started is made, with a state that players have participated in the multi-person play being maintained.

According to Configuration 5, even after the game program with which multi-person play is made is terminated, the same players can immediately start multi-person play.

(Configuration 6) Another exemplary embodiment provides a game system including a plurality of information processing apparatuses, each of the plurality of information processing apparatuses including a processor. The processor of each of the plurality of information processing apparatuses establishes communication between/among the plurality of information processing apparatuses, executes a game program adapted to multi-person play with a plurality of emulators as many as the number of participants in multi-person play, executes the game program with a first emulator based on an operation input provided by a player, transmits data on the operation input by the player to another information processing apparatus of the information processing apparatuses, outputs to a display, an image of a game executed with the first emulator, obtains data on an operation input by another player from the another information processing apparatus, executes the game program with an emulator other than the first emulator based on the obtained operation input by the another player, and proceeds with multi-person play of the game by transmission and reception between/among the plurality of emulators, of data defined as data to be transmitted and received in multi-person play of the game program.

(Configuration 7) In Configuration 6, when another information processing apparatus issues a request for participation of another player in the multi-person play, the processor of each of the plurality of information processing apparatuses may allow a state that the another player has not participated in the multi-person play to continue while the game program is being executed and allow the another player to participate in the multi-person play and execute the plurality of emulators as many as the number of participants in the multi-person play to proceed with multi-person play based on the first emulator and another emulator when transition to a scene where execution of the game program with the first emulator is started is made.

According to Configuration 7, even when a game program (in the past) for which connection to/disconnection from another information processing apparatus during progress of multi-person play has not been assumed is executed with the emulator, multi-person play can normally be started while the game program itself remains the same without being modified.

(Configuration 8) In Configuration 6 or 7, during the multi-person play, the processor of each of the plurality of information processing apparatuses may temporarily suspend the game when an instruction to quit the game is given or when a request to quit the game is given from another player based on communication, and terminate the game program when an instruction to quit the game is given from information processing apparatuses of all players who participate in the multi-person play.

According to Configuration 8, even when a game program (in the past) for which connection to/disconnection from another information processing apparatus during progress of multi-person play has not been assumed is executed with the emulator, multi-person play can normally be terminated while the game program itself remains the same without being modified.

(Configuration 9) In any of Configurations 6 to 8, the game program adapted to the multi-person play may be at least one of a plurality of game programs adapted to multi-person play, and the scene where execution of the game program with the first emulator is started may be a scene where selection as to which of the plurality of game programs is to be started is made. According to Configuration 9, an effect similar to that in Configuration 3 is obtained.

(Configuration 10) In any of Configurations 6 to 9, when the instruction to quit the game is given from the information processing apparatuses of all players who participate in the multi-person play and the game program is terminated, the processor of each of the plurality of information processing apparatuses may cause transition to the scene where selection as to which of the plurality of game programs is to be started is made. According to Configuration 10, an effect similar to that in Configuration 4 is obtained.

(Configuration 11) In any of Configurations 6 to 10, when the instruction to quit the game is given from the information processing apparatuses of all players who participate in the multi-person play and the game program is terminated, the processor of each of the plurality of information processing apparatuses may cause transition to the scene where selection as to which of the plurality of game programs is to be started is made, with a state that players have participated in the multi-person play being maintained. According to Configuration 11, an effect similar to that in Configuration 5 is obtained.

(Configuration 12) Another exemplary embodiment provides a game device including a processor. The processor of the game device executes a game program adapted to multi-person play with a first emulator based on an operation input, transmits data on the operation input to another game device, outputs to a display, an image of a game executed with the first emulator, obtains data on an operation input by another player from the another game device, executes the game program with a second emulator based on the obtained operation input by the another player, and proceeds with multi-person play of the game by transmission and reception between the first emulator and the second emulator, of data defined as data to be transmitted and received in multi-person play of the game program.

(Configuration 13) In Configuration 12, when the another game device issues a request for participation of the another player in the multi-person play, the processor of the game device may allow a state that the another player has not participated in the multi-person play to continue while the game program is being executed and allow the another player to participate in the multi-person play and proceed with multi-person play based on the first emulator and the second emulator when transition to a scene where execution of the game program with the first emulator is started is made. During the multi-person play, the processor of the game device may further temporarily suspend the game when an instruction to quit the game is given or when a request to quit the game is given from another player based on communication, and terminate the game program when an instruction to quit the game is given from game devices of all players who participate in the multi-person play. According to Configuration 13, an effect similar to that in Configuration 2 is obtained.

(Configuration 14) In Configuration 12 or 13, the game program adapted to the multi-person play may be at least one of a plurality of game programs adapted to multi-person play, and the scene where execution of the game program with the first emulator is started may be a scene where selection as to which of the plurality of game programs is to be started is made. According to Configuration 14, an effect similar to that in Configuration 3 is obtained.

(Configuration 15) In any of Configurations 12 to 14, when the instruction to quit the game is given from the game devices of all players who participate in the multi-person play and the game program is terminated, the processor of the game device may cause transition to the scene where selection as to which of the plurality of game programs is to be started is made. According to Configuration 15, an effect similar to that in Configuration 4 is obtained.

(Configuration 16) In any of Configurations 12 to 15, when the instruction to quit the gamed is given from the game devices of all players who participate in the multi-person play and the game program is terminated, the processor of the game device may cause transition to the scene where selection as to which of the plurality of game programs is to be started is made, with a state that players have participated in the multi-person play being maintained. According to Configuration 16, an effect similar to that in Configuration 5 is obtained.

(Configuration 17) Another exemplary embodiment provides an information processing method. In the method, a processor of a game device executes a game program adapted to multi-person play with a first emulator based on an operation input, the processor transmits data on the operation input to another game device, the processor outputs to a display, an image of a game executed with the first emulator, the processor obtains data on an operation input provided by another player from the another game device, the processor executes the game program with a second emulator based on the obtained operation input by the another player, and the processor proceeds with multi-person play of the game by transmission and reception between the first emulator and the second emulator, of data defined as data to be transmitted and received in multi-person play of the game program. According to Configuration 17, an effect similar to that in Configuration 1 is obtained.

(Configuration 18) In Configuration 17, when the another game device issues a request for participation of the another player in the multi-person play, the processor may allow a state that the another player has not participated in the multi-person play to continue while the game program is being executed and allow the another player to participate in the multi-person play and proceed with multi-person play based on the first emulator and the second emulator when transition to a scene where execution of the game program with the first emulator is started is made. During the multi-person play, the processor may temporarily suspend the game when an instruction to quit the game is given or when a request to quit the game is given from another player based on communication, and terminate the game program when an instruction to quit the game is given from game devices of all players who participate in the multi-person play. According to Configuration 18, an effect similar to that in Configuration 2 is obtained.

(Configuration 19) In Configuration 17 or 18, the game program adapted to the multi-person play may be at least one of a plurality of game programs adapted to multi-person play, and the scene where execution of the game program with the first emulator is started may be a scene where selection as to which of the plurality of game programs is to be started is made. According to Configuration 19, an effect similar to that in Configuration 3 is obtained.

(Configuration 20) In any of Configurations 17 to 19, when the instruction to quit the game is given from the game devices of all players who participate in the multi-person play and the game program is terminated, the processor may cause transition to the scene where selection as to which of the plurality of game programs is to be started is made. According to Configuration 20, an effect similar to that in Configuration 4 is obtained.

(Configuration 21) In any of Configurations 17 to 20, when the instruction to quit the game is given from the game devices of all players who participate in the multi-person play and the game program is terminated, the processor may cause transition to the scene where selection as to which of the plurality of game programs is to be started is made, with a state that players have participated in the multi-person play being maintained. According to Configuration 21, an effect similar to that in Configuration 5 is obtained.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 8 shows an exemplary illustrative non-limiting drawing illustrating exemplary player operation information exchanged by the game device according to the present embodiment.

DETAILED DESCRIPTION OF NON-LIMITING EXAMPLE EMBODIMENTS

Figure 1:
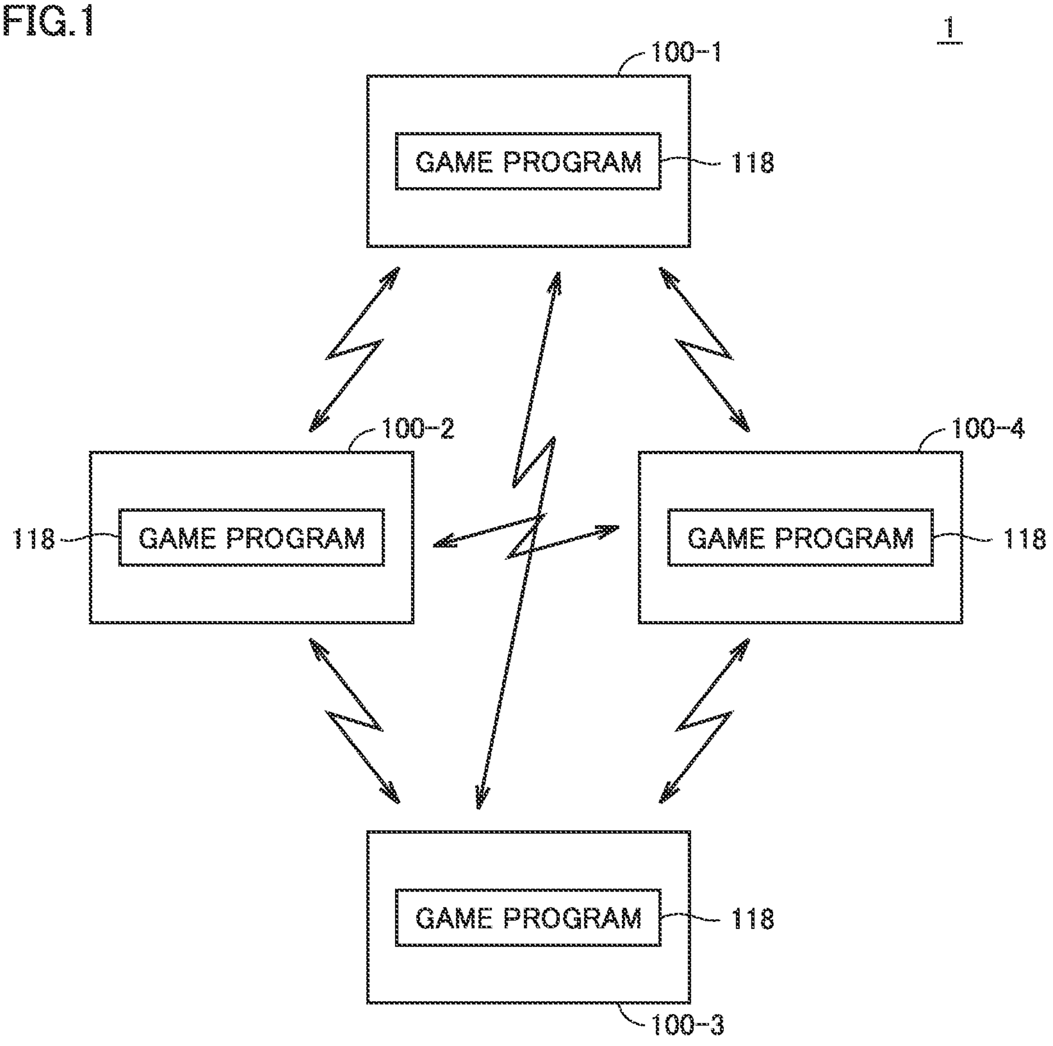
FIG. 1 shows an exemplary illustrative non-limiting drawing illustrating a configuration of a game system according to the present embodiment.

The present embodiment will be described in detail with reference to the drawings. The same or corresponding elements in the drawings have the same reference characters allotted and description thereof will not be repeated.

A. Exemplary Configuration of Game System

An exemplary configuration of a game system according to the present embodiment will initially be described.

The game system includes one or more information processing apparatuses. Any hardware configuration of the information processing apparatus may be applicable so long as the information processing apparatus can execute a game program with an emulator. The information processing apparatus may be implemented, for example, by a game device, a smartphone, a tablet, a portable telephone, or a personal computer. An exemplary configuration where a game device 100 representing a computer is adopted will be described below by way of example of the information processing apparatus.

FIG. 1 is a schematic diagram showing an exemplary configuration of a game system 1 according to the present embodiment. FIG. 1 shows an exemplary configuration in which four game devices 100-1 to 100-4 (which may also collectively be referred to as a "game device 100" below) are connected through local communication by way of example of a network.

Each of game devices 100 can communicate with one or more other game devices 100. So long as data can mutually be exchanged between/among game devices 100, any communication method (wired and wireless) may be adopted in game system 1 shown in FIG. 1. Game devices 100 may directly communicate with each other (for example, an ad hoc mode of wireless LAN) or communicate with a repeater being interposed (for example, an infrastructure mode of wireless LAN).

Figure 2:
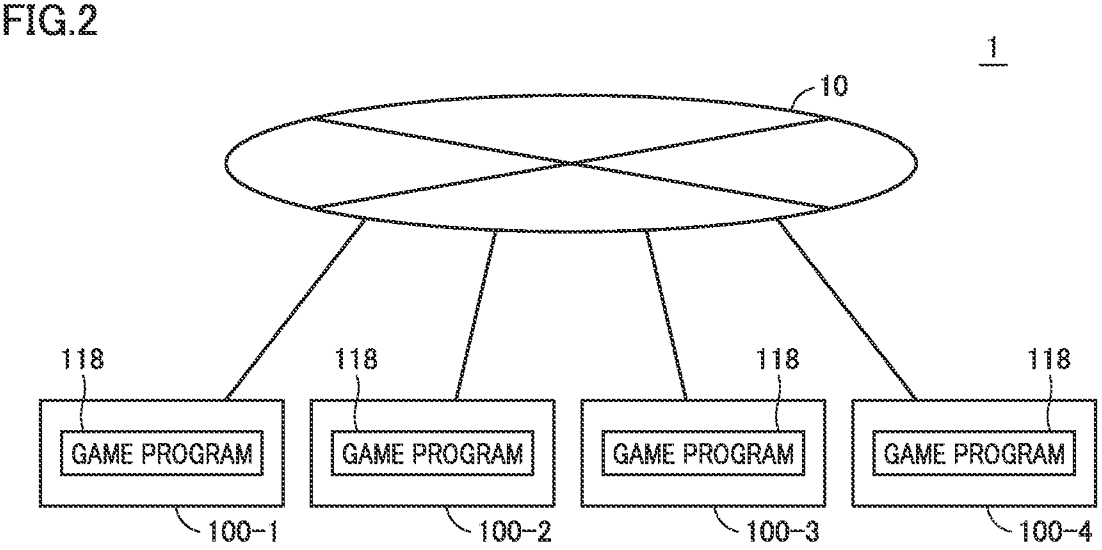
FIG. 2 shows an exemplary illustrative non-limiting drawing illustrating another configuration of the game system according to the present embodiment.

FIG. 2 is a schematic diagram showing another exemplary configuration of game system 1 according to the present embodiment. FIG. 2 shows an exemplary configuration in which four game devices 100-1 to 104 are connected through online connection over a network 10 by way of another example of the network. Game devices 100 mutually exchange data over network 10.

In game system 1 shown in FIG. 2, wired and wireless communication methods may be adopted as a communication method for connection of each of game devices 100 to network 10.

In each of FIGS. 1 and 2, each of game devices 100 can execute a game program 118 with an emulator. Game program 118 may be an application sold in the past.

In an example where game program 118 is adapted to multi-person play, each of game devices 100 communicates with another game device 100 and executes game program 118 adapted to multi-person play based on an operation input (provided by a player of each of game devices 100) with an emulator. Each of game devices 100 transmits data on the operation input to another game device 100.

"Multi-person play" herein means simultaneous play of the same game program by a plurality of players (users). Alternatively, "multi-person play" means participation of a plurality of players (users) in the same player group. Further alternatively, "multi-person play" means execution of game program 118 in each of game devices 100 based not only on information on an operation by a player of that game device 100 but also on information from another game device 100.

All game devices 100 may hold in advance game program 118 with any method. When there is game device 100 that does not hold game program 118, that game device 100 may download game program 118 from game device 100 that holds game program 118.

Alternatively, at least one game device 100 or all game devices 100 may download game program 118 as appropriate from a server (not shown) or the like.

B. Exemplary Hardware Configuration

An exemplary hardware configuration of game device 100 included in game system 1 according to the present embodiment will now be described.

Figure 3:
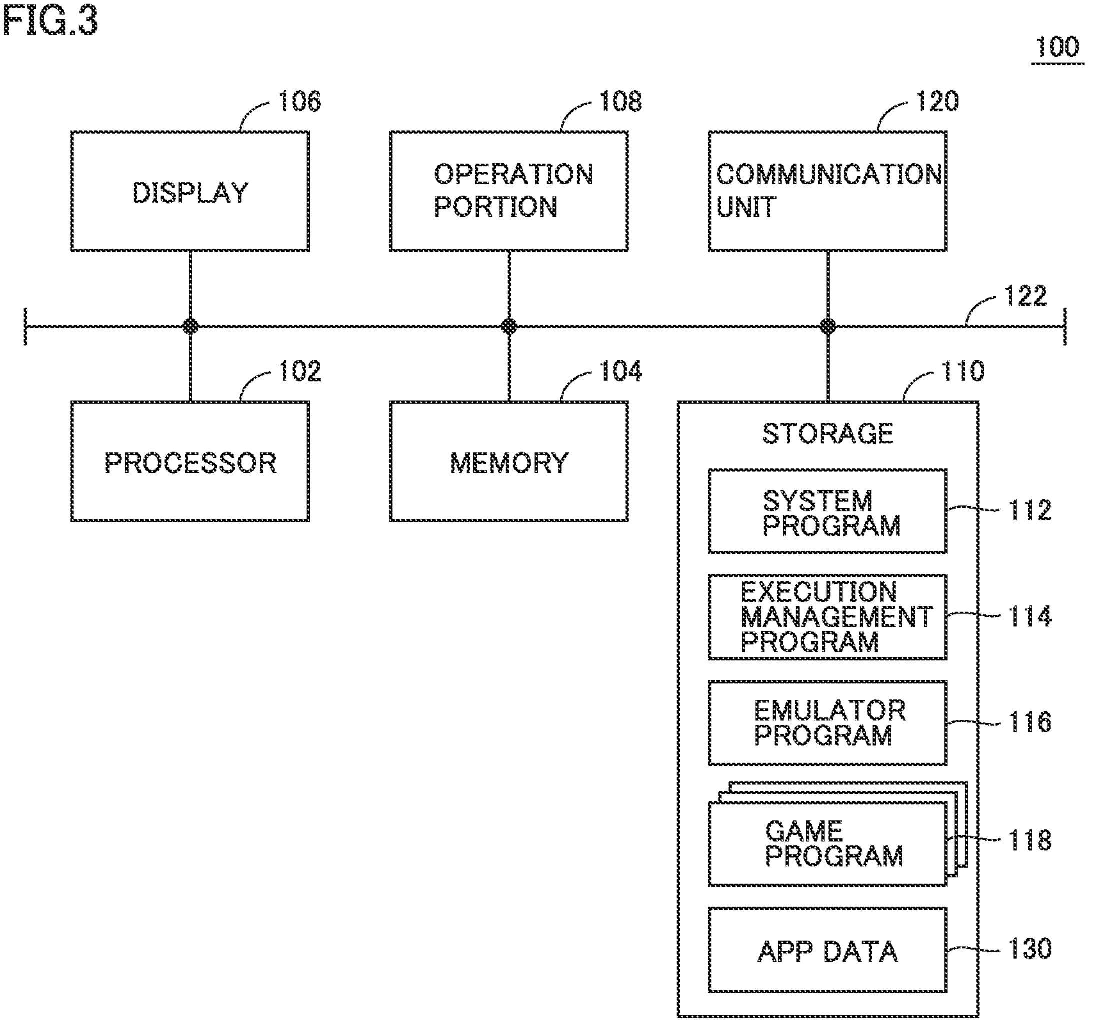
FIG. 3 shows an exemplary illustrative non-limiting drawing illustrating a hardware configuration of a game device according to the present embodiment.

FIG. 3 is a schematic diagram showing an exemplary hardware configuration of game device 100 according to the present embodiment. Referring to FIG. 3, game device 100 represents a computer by way of example, and includes one or more processors 102, a memory 104, a storage 110, a display 106, an operation portion 108, and a communication unit 120. These components are connected to communicate data with one another through a bus 122.

Processor 102 is a processing entity for performing processing provided by game device 100. Processor 102 executes a program stored in storage 110 by sequentially developing a necessary part thereof on memory 104.

Memory 104 is a volatile storage device (storage medium) that can be accessed by processor 102, and it may be implemented, for example, by a dynamic random access memory (DRAM) or a static random access memory (SRAM).

Storage 110 is a non-volatile storage device (storage medium) that can be accessed by processor 102, and it may be implemented, for example, by a hard disk or a solid state drive (SSD). Storage 110 may be, for example, a storage medium attachable to and removable from game device 100 such as an optical disc or a cartridge.

A system program 112, an execution management program 114, and an emulator program 116 are stored in storage 110.

System program 112 includes a computer-readable instruction for having processor 102 perform basic processing necessary for functioning as game device 100.

Execution management program 114 includes a computer-readable instruction for having processor 102 execute game program 118 with an emulator.

Emulator program 116 includes a computer-readable instruction for having processor 102 virtually set up an environment for execution of game program 118.

An "information processing program" according to the present embodiment includes at least execution management program 114. The "information processing program" may include system program 112 and/or emulator program 116. How a program is implemented is a matter of design and can be determined as appropriate in accordance with required performance and restrictions.

One or more game programs 118 may be stored in storage 110 or downloaded as appropriate from a server or the like in response to a request from a player. In this case, the game program does not have to be stored in storage 110, although it is developed on memory 104 only while it is executed.

By way of example, game program 118 is a program created to be executed in a game device (for example, a game device in the past developed prior to game device 100) different from game device 100. Even in execution of game program 118 by game device 100, it may remain original. In other words, game program 118 does not have to be modified for being executed with the emulator of game device 100.

App data 130 generated as a result of execution of game program 118 may be stored in storage 110.

Display 106 shows a game screen generated as a result of information processing by processor 102. A plurality of displays 106 may be provided. Game device 100 may be configured to use one or more external displays.

Operation portion 108 accepts an operation input from a player of game device 100. Operation portion 108 includes, for example, a push button, a control lever, a touch panel, a mouse, and/or the like. Operation portion 108 may be implemented by a game controller which is separate from game device 100 and connected through a wire or wirelessly.

Communication unit 120 communicates with another game device 100. Communication unit 120 may include hardware necessary for wired communication and/or hardware necessary for wireless communication. The entirety or a part of processing by communication unit 120 may be performed by processor 102.

Though FIG. 3 shows game device 100 as an integrated apparatus, the game device may be implemented as an assembly of a plurality of apparatuses. In other words, a single game device 100 may be implemented by combination of a plurality of independent apparatuses. For example, a separate configuration composed of a main body including hardware corresponding to processor 102, memory 104, and storage 110 and a display and operation portion including hardware corresponding to display 106 and operation portion 108 may be adopted.

At least a part of processing performed in game device 100 may be performed discretely by one or more other apparatuses arranged as being distributed over a network.

Processing performed in game device 100 may be implemented by execution of a program by processor 102, and a part or the entirety of the processing may be implemented by hard-wired circuitry such as an application specific integrated circuit (ASIC) or a field programmable gate array (FPGA). Therefore, the term "processor" herein encompasses not only an ordinary meaning of a processing circuit that performs processing in accordance with a computer-readable instruction described in a program, such as a central processing unit (CPU), a micro processing unit (MPU), or a graphics processing unit (GPU), but also hard-wired circuitry such as an ASIC or an FPGA. In the hard-wired circuitry such as an ASIC or an FPGA, circuitry corresponding to processing to be executed is formed in advance. Furthermore, the "processor" herein also encompasses circuitry in which a plurality of functions are integrated, such as a system on chip (SoC).

C. Exemplary Functional Configuration

An exemplary functional configuration of game device 100 included in game system 1 according to the present embodiment will now be described.

Figure 4:
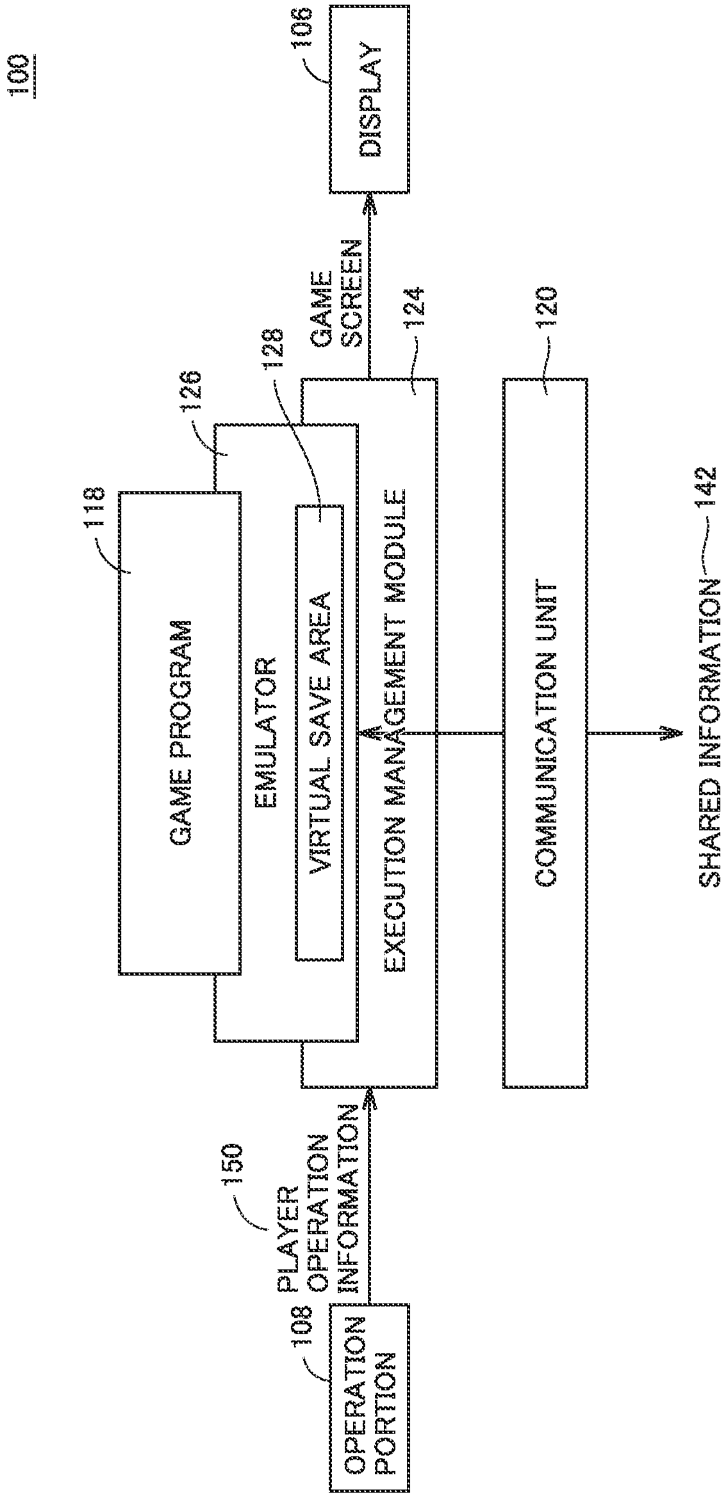
FIG. 4 shows an exemplary illustrative non-limiting drawing illustrating a functional configuration of the game device according to the present embodiment.

FIG. 4 is a schematic diagram showing an exemplary functional configuration of game device 100 according to the present embodiment. Referring to FIG. 4, game device 100 includes an execution management module 124 and an emulator 126 as its main functional configuration. Execution management module 124 is an instance generated by execution of execution management program 114 (FIG. 3) by processor 102 of game device 100, and emulator 126 is an instance generated by execution of emulator program 116 (FIG. 3) by processor 102 of game device 100. A plurality of emulators 126 may be generated in a single game device 100.

Execution management module 124 performs such processing as selection of game program 118 to be executed with emulator 126, management of execution of selected game program 118 with emulator 126, exchange of player operation information and shared data, and output of a game screen.

Execution management module 124 obtains data on an operation input provided from a player (player operation information 150) onto operation portion 108 of the player's device and provides the data to emulator 126. Execution management module 124 outputs a game screen obtained as a result of execution of game program 118 with emulator 126 to display 106. In addition, execution management module 124 may output from a speaker (not shown), voice and sound obtained as a result of execution of game program 118 with emulator 126.

Emulator 126 is a virtual environment for execution of game program 118, and it receives player operation information 150 and outputs a game screen and voice and sound as a result of execution. Emulator 126 exchanges shared data 142 with another emulator 126. Shared data 142 corresponds to data exchanged through a physical communication cable by a previous portable game console. Shared data 142 is defined as data transmitted and received in multi-person play of game program 118. Shared data 142 includes information necessary for implementation of multi-person play and includes, for example, a coordinate of a character or an instruction for an action.

Emulator 126 includes a virtual save area 128 for game program 118 to have data saved. Virtual save area 128 behaves like an inherent save area from a point of view of game program 118. Though virtual save area 128 itself may be implemented on memory 104, saved data (app data) may be stored in storage 110 (for example, app data 130 in FIG. 3). Emulator 126 can be implemented based on a known technology.

In game system 1 according to the present embodiment, emulators 126 can establish connection that simulates a physical communication cable.

Figure 5:
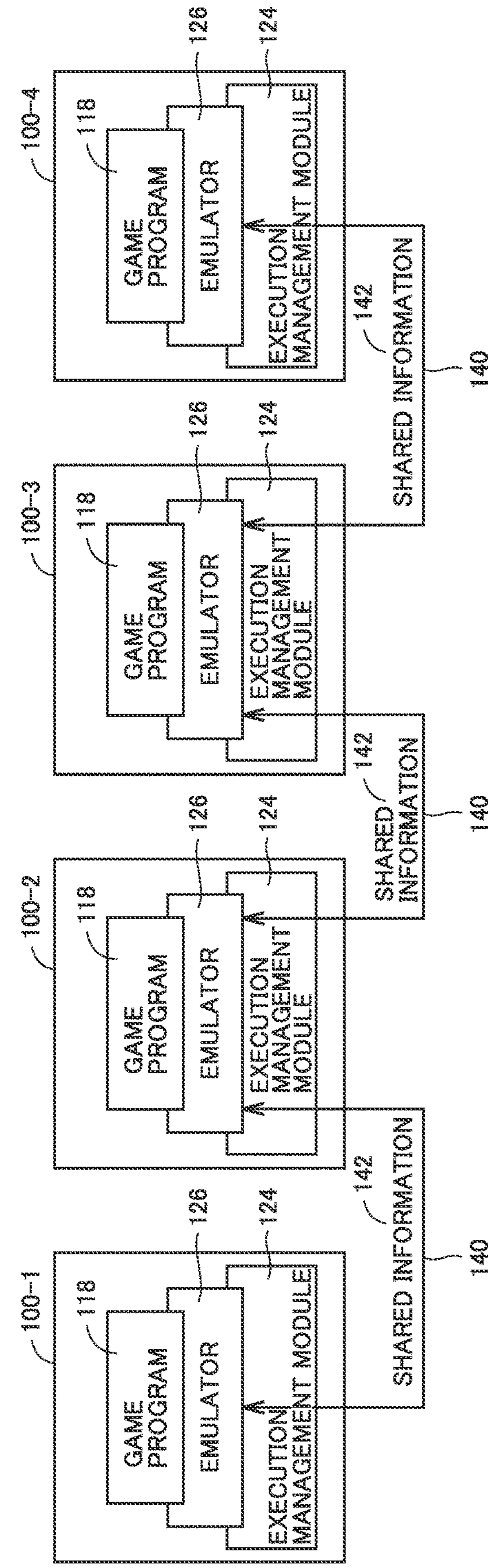
FIG. 5 shows an exemplary illustrative non-limiting drawing illustrating connection among game devices according to the present embodiment.

FIG. 5 is a schematic diagram for illustrating exemplary connection between/among game devices 100 according to the present embodiment. FIG. 5 shows an exemplary configuration in multi-person play of game program 118 by game devices 100-1 to 100-4, for example. Emulators 126 of game devices 100 establish connection 140 that simulates a communication cable by means of execution management modules 124. Connection 140 refers to a virtual or logical data transmission channel.

Emulator 126 exchanges with another emulator 126 through connection 140, shared data 142 that has been exchanged through a physical communication cable by a previous portable game console. By establishing connection 140, from a point of view of game program 118, an environment similar to that of a plurality of portable game consoles connected through a physical communication cable can be provided.

Instead of the exemplary functional configuration shown in FIGS. 4 and 5, a functional configuration with which an unexpected operation such as forced termination can more reliably be suppressed even on the occurrence of cut-off of communication may be adopted.

Figure 6:
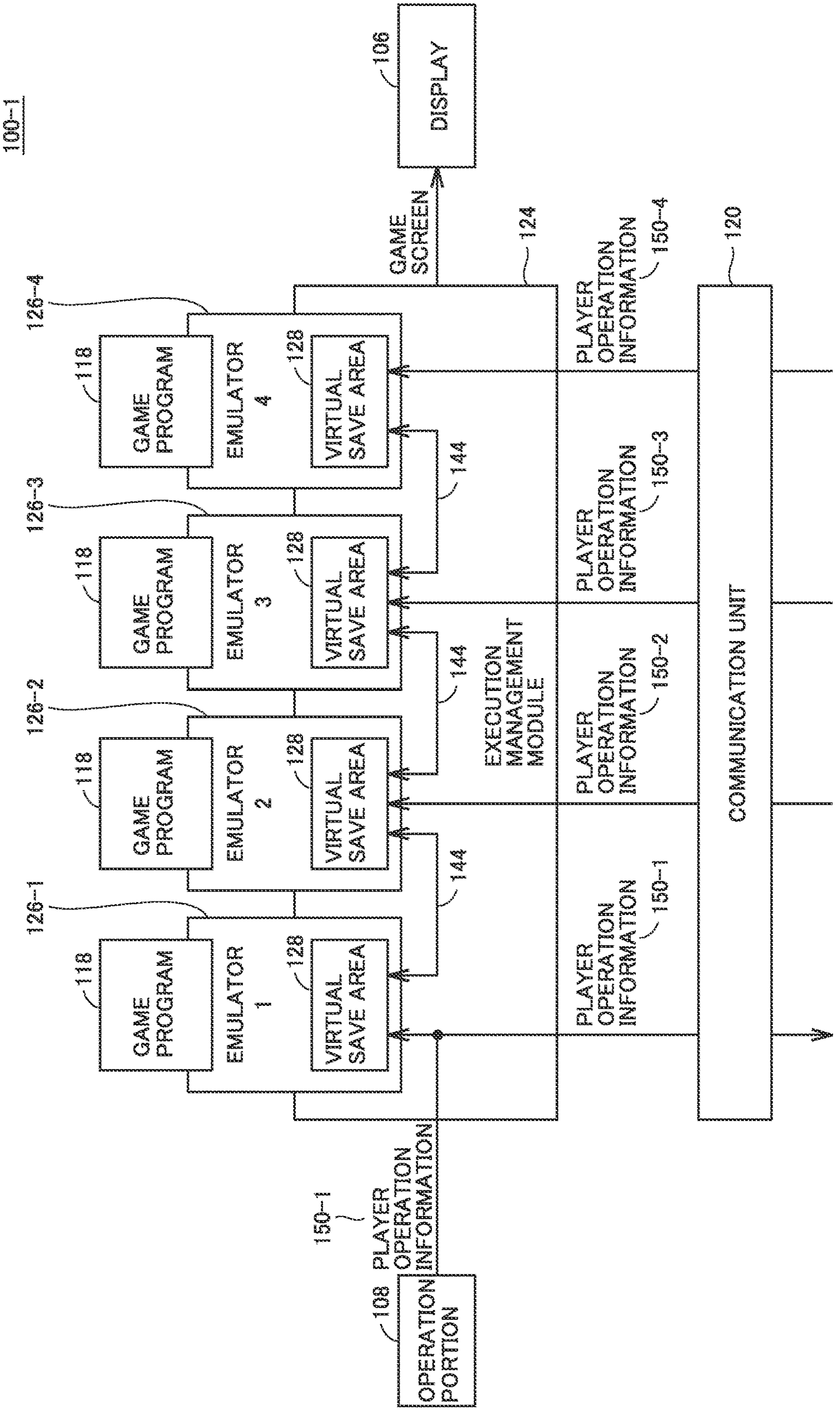
FIG. 6 shows an exemplary illustrative non-limiting drawing illustrating another functional configuration of the game device according to the present embodiment.

FIG. 6 is a schematic diagram showing another exemplary functional configuration of game device 100 according to the present embodiment. FIG. 6 shows an exemplary functional configuration of game device 100-1, for example, in multi-person play of game program 118 by game devices 100-1 to 100-4. Other game devices 100-2 to 100-4 are also similar in functional configuration to FIG. 6.

Referring to FIG. 6, game device 100-1 (and game devices 100-2 to 100-4) include emulators 126 (emulators 126-1 to 126-4) as many as players (game devices 100) who participate in multi-person play. In other words, emulators 126-1 to 126-4 are responsible for execution of game program 118 in respective game devices 100-1 to 100-4.

Emulators 126-1 to 126-4 require data (player operation information 150-1 to 150-4) on operation inputs provided by respective players to operation portions 108 of respective game devices 100-1 to 100-4. Therefore, each game device 100 transmits an operation input (player operation information 150) provided by the player to another game device 100 and receives an operation input (player operation information 150) provided by another player onto another game device 100. Player operation information 150-1 to 150-4 shown in FIG. 6 means operation contents obtained in respective game devices 100-1 to 100-4.

In the example shown in FIG. 6, execution management module 124 of game device 100-1 transmits player operation information 150-1 through communication unit 120 to another game device 100 and obtains player operation information 150-2 to 150-4 from other game devices 100 through communication unit 120.

Player operation information 150-1 to 150-4 is provided to emulators 126-1 to 126-4, respectively. Emulators 126-1 to 126-4 execute game program 118 based on player operation information 150-1 to 150-4, respectively.

Emulators 126-1 to 126-4 are independent of one another. Emulators 126-1 to 126-4 establish connections 144 that simulate a communication cable by means of execution management module 124. Connection 144 refers to a virtual or logical data transmission channel similarly to connection 140 shown in FIG. 5.

Execution management module 124 can output to display 106, a game screen resulting from execution of game program 118 with each of emulators 126-1 to 126-4. Normally, a game screen generated by emulator 126 corresponding to a device to which it belongs (for example, emulator 126-1 for game device 100-1) is outputted to display 106.

When an instruction for screen sharing is given in at least one game device 100 as will be described later, however, the game screen generated by game device 100 (emulator 126) where the instruction has been given may be outputted.

Figure 7:
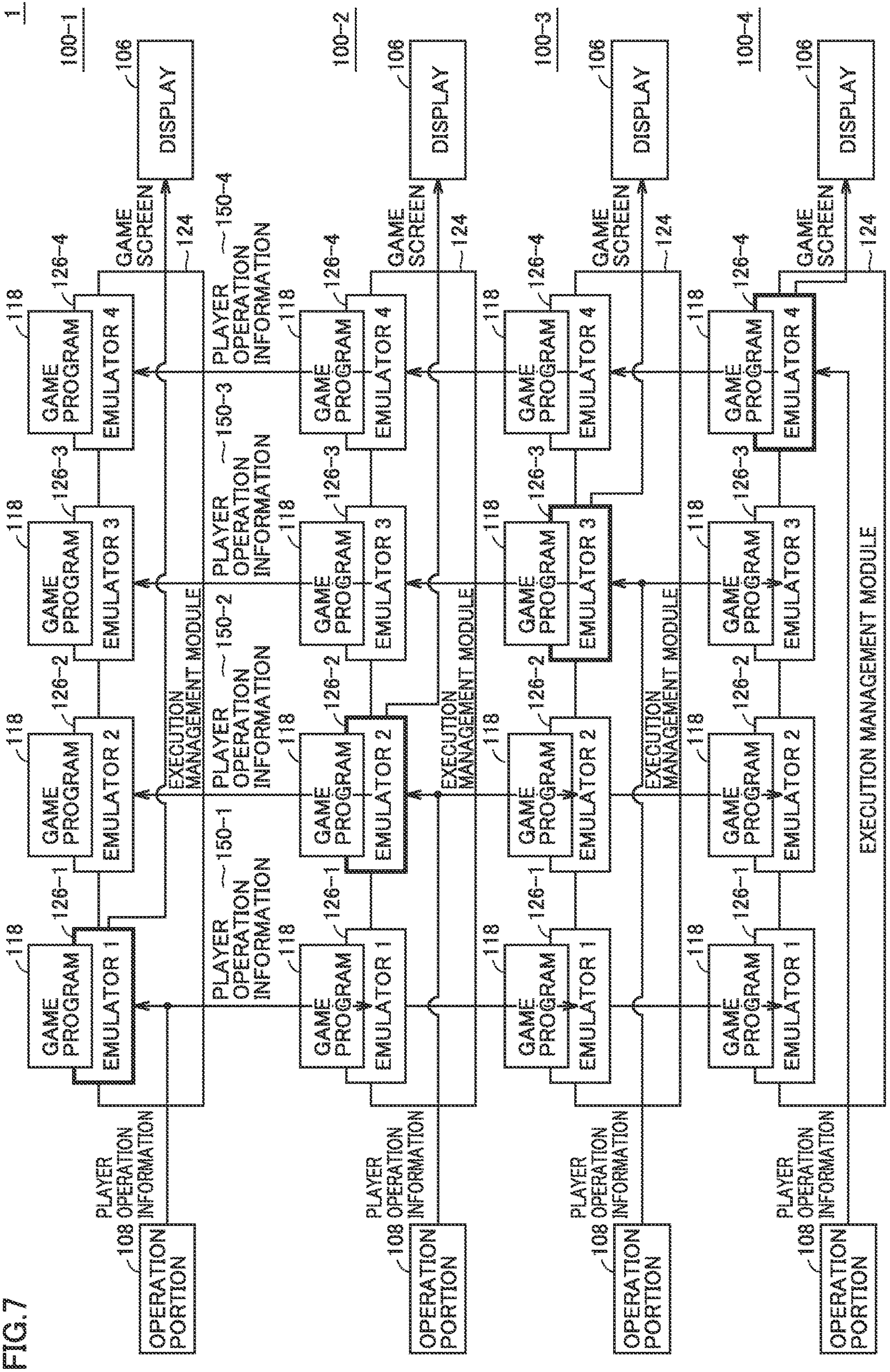
FIG. 7 shows an exemplary illustrative non-limiting drawing illustrating a configuration of the game system corresponding to FIG. 6.

FIG. 7 is a schematic diagram showing an exemplary configuration of game system 1 corresponding to FIG. 6. Referring to FIG. 7, each of game devices 100-1 to 100-4 included in game system 1 includes four emulators 126-1 to 126-4.

Data (player operation information 150-1) on an operation input provided by the player of game device 100-1 onto operation portion 108 of game device 100-1 is inputted to emulator 126-1 of each of game devices 100-1 to 100-4.

Similarly, data (player operation information 150-2) on an operation input provided by the player of game device 100-2 onto operation portion 108 of game device 100-2 is inputted to emulator 126-2 of each of game devices 100-1 to 100-4.

Similarly, data (player operation information 150-3) on an operation input provided by the player of game device 100-3 onto operation portion 108 of game device 100-3 is inputted to emulator 126-3 of each of game devices 100-1 to 100-4.

Similarly, data (player operation information 150-4) on an operation input provided by the player of game device 100-4 onto operation portion 108 of game device 100-4 is inputted to emulator 126-4 of each of game devices 100-1 to 100-4.

In a normal state, each of game devices 100-1 to 100-4 outputs to display 106, a game screen generated by emulator 126 corresponding thereto.

As player operation information 150-1 to 150-4 is inputted to respective emulators 126-1 to 126-4 in each of game devices 100-1 to 100-4, multi-person play is implemented in each of game devices 100-1 to 100-4.

Thus, each of game devices 100-1 to 100-4 executes with the emulator corresponding thereto, game program 118 adapted to multi-person play based on an operation input, and transmits data on the operation input (player operation information 150) to another game device 100. An image of a game (game screen) executed with the emulator corresponding to one game device is outputted to display 106 thereof. Concurrently, each of game devices 100-1 to 104 obtains data on an operation input by another player (player operation information 150) from another game device and executes with the emulator corresponding to another game device, game program 118 based on the obtained operation input by another player. Furthermore, as data (shared data 142) defined as data to be transmitted and received in multi-person play of game program 118 is transmitted and received between the emulator corresponding to one game device and the emulator corresponding to another game device, multi-person play of the game proceeds.

As the configuration as shown in FIG. 7 is adopted, even on the occurrence of cut-off of communication with another game device 100, each of game devices 100-1 to 100-4 is simply unable to receive input of player operation information 150 from another game device 100 and can maintain progress of multi-person play per se. Therefore, such a situation that multi-person play is forcibly terminated can be avoided.

Though FIGS. 6 and 7 show an exemplary configuration including four game devices 100, any number of game devices 100 may be provided.

D. Player Operation Information

In the exemplary configuration shown in FIGS. 6 and 7 described above, each of game devices 100 reproduces play by all players who participate in multi-person play. For synchronization of contents in multi-person play between/among game devices 100, processing as below may be adopted.

For example, in an example where delay in communication of player operation information 150 is unignorable, information that allows identification of operation timing may be added to player operation information 150.

FIG. 8 is a schematic diagram showing exemplary player operation information 150 exchanged by game device 100 according to the present embodiment.

Referring to FIG. 8, each of pieces of player operation information 150-1 to 150-4 includes operation contents 154 representing a key in operation portion 108 operated by a player and a frame number 152 indicating timing of operation by the player onto operation portion 108.

Frame number 152 is a number representing a cycle where game program 118 is executed with emulator 126.

Each emulator 126 determines timing to obtain corresponding operation contents 154 during execution of game program 118, based on frame number 152 included in player operation information 150. Execution management module 124 and/or emulator 126 may include a buffer where player operation information 150 is temporarily stored.

As player operation information 150 includes frame number 152, such a situation that contents of multi-person play that proceeds between/among game devices 100 are inconsistent can be avoided even on the occurrence of delay in communication.

Though an exemplary configuration in which frame number 152 is used is described by way of example, any information may be added so long as the information allows identification of timing of operation by a player. For example, information on time or a counter value may be added.

Furthermore, consistency of contents in multi-person play that proceeds between/among game devices 100 may regularly be checked. For example, with game device 100 that operates as a host being defined as the reference, whether or not a current state in multi-person play on game device 100 that operates as a guest are consistent with a current state in multi-person play on the host may regularly be determined. When the contents are inconsistent, a value on the memory or the like may be corrected as appropriate for consistency with game device 100 that operates as the host. The "host" and the "guest" will be described later.

E. Exemplary Processing Procedure in Execution of Game Program

An exemplary processing procedure in execution of game program 118 by game device 100 included in game system 1 according to the present embodiment will now be described.

In connection with game program 118 adapted to multi-person play, a plurality of players simultaneously participate. Therefore, for game device 100, by way of example, selection between two modes of a "host" that calls for participation in multi-person play and a "guest" that participates in response to a call from the "host" can be made.

Figure 9:
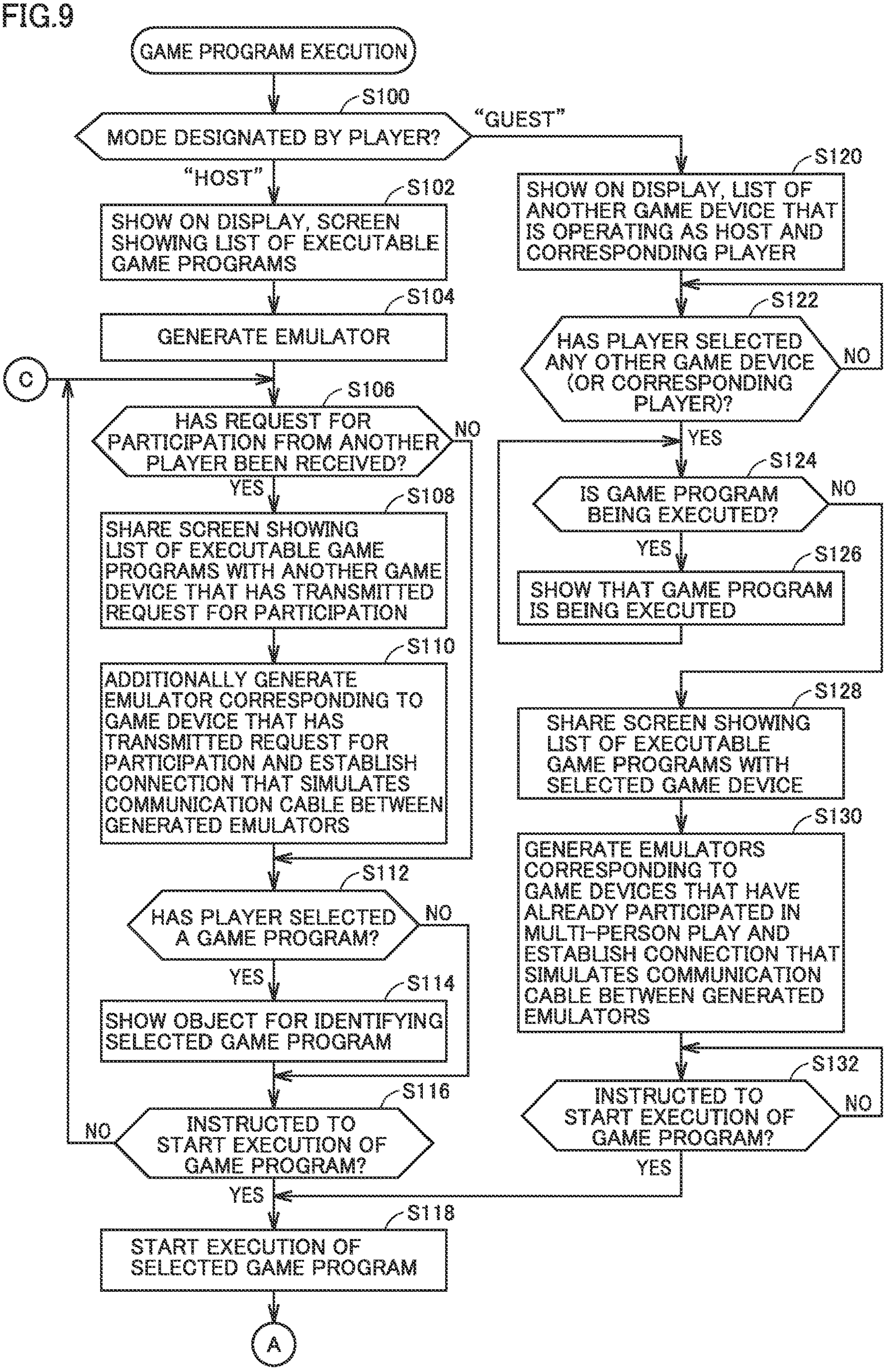
FIGS. 9 and 10 show exemplary illustrative non-limiting drawings illustrating an exemplary processing procedure when the game device included in the system according to the present embodiment executes a game program.
Figure 10:
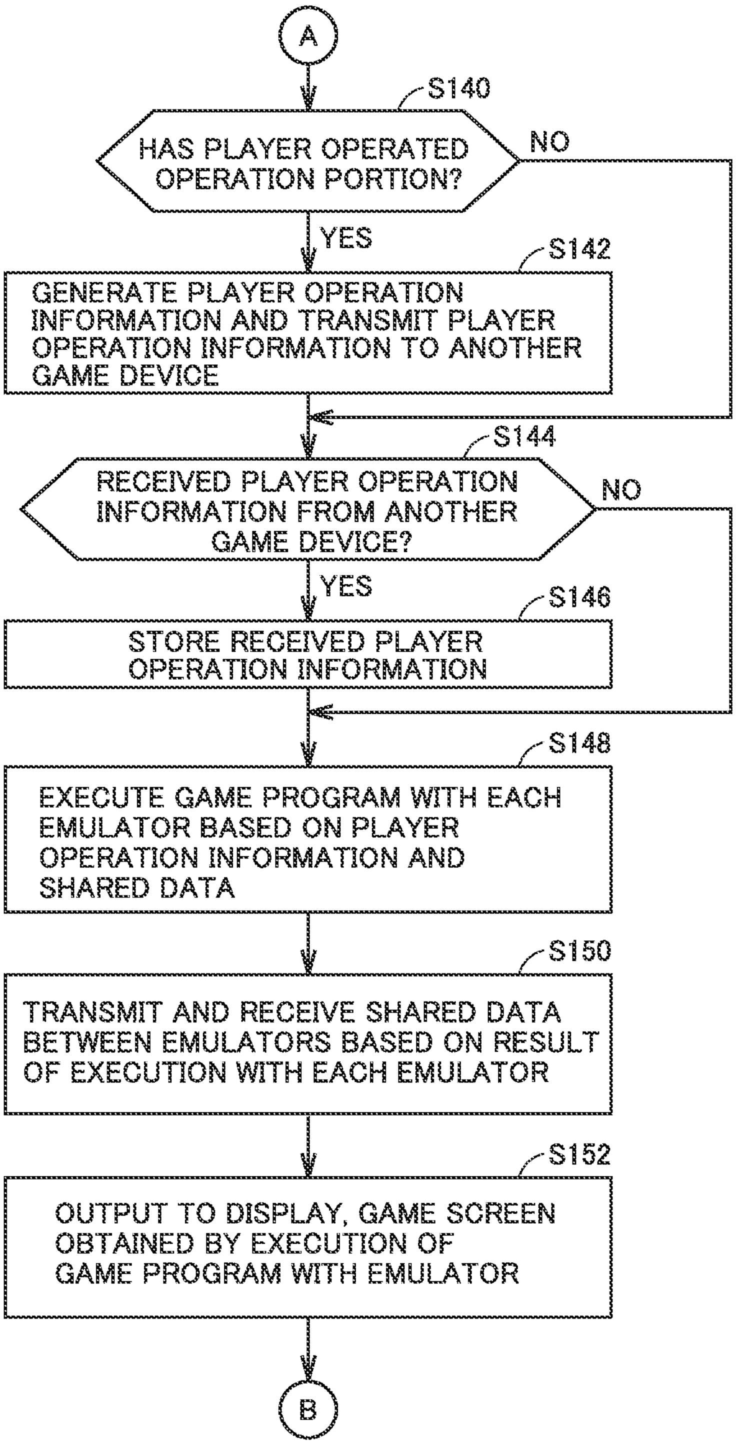
Figure 11:
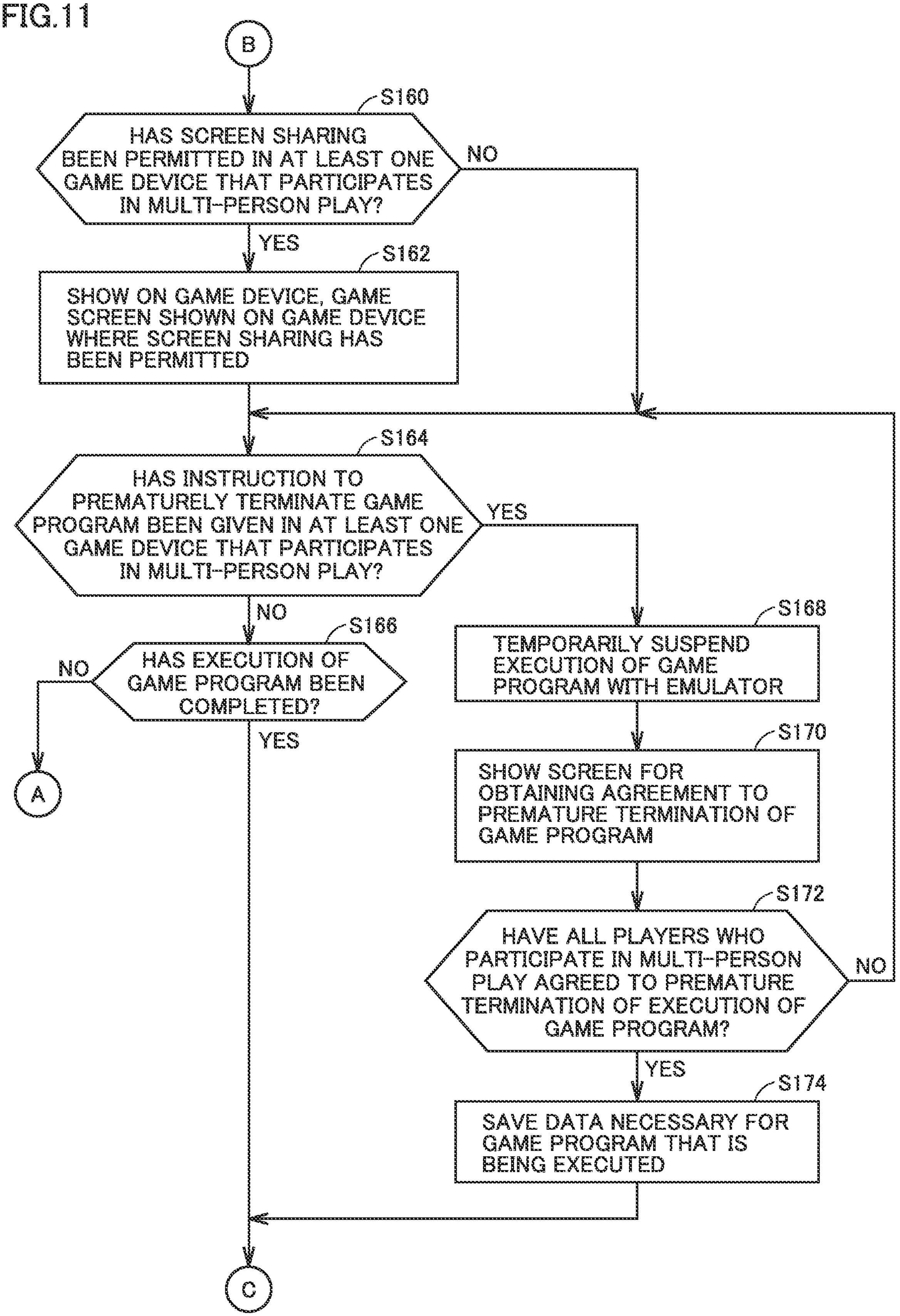
FIG. 11 shows an exemplary illustrative non-limiting drawing illustrating a processing procedure in execution of a game program by the game device included in the system according to the present embodiment.

FIGS. 9 to 11 are flowcharts showing an exemplary processing procedure in execution of game program 118 by game device 100 included in the system according to the present embodiment. Each step shown in FIGS. 9 to 11 may be implemented, for example, at least by execution of execution management program 114 (FIG. 3) by processor 102 of game device 100.

Referring to FIG. 9, game device 100 determines in which mode it is instructed to operate by a player (step S100).

Figure 12:
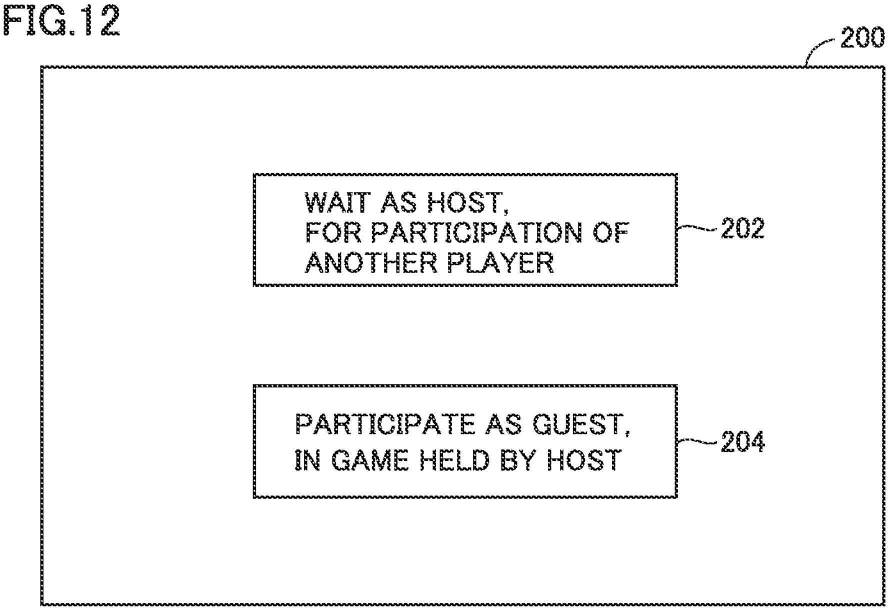
FIG. 12 shows an exemplary illustrative non-limiting drawing illustrating a user interface screen for acceptance of mode selection, by the game device according to the present embodiment.

FIG. 12 is a schematic diagram showing an exemplary user interface screen 200 for acceptance of mode selection, by game device 100 according to the present embodiment. Referring to FIG. 12, user interface screen 200 includes a button 202 for giving an instruction to wait, as the host, for participation of another player and a button 204 for giving an instruction to participate, as a guest, in a game held by the host. A player selects button 202 or button 204.

Referring again to FIG. 9, when the player gives an instruction to operate as the host ("host" in step S100), game device 100 shows on display 106, a screen showing a list of executable game programs 118 (step S102).

Processing in steps S102 to S116 corresponds to a scene in which game program 118 adapted to multi-person play is selected. Only game program 118 adapted to multi-person play may be shown on display 106, or game program 118 not adapted to multi-person play may also be shown. In the latter case, a manner of representation may be different such that a player can distinguish whether or not a game can be played by multiple persons.

Game device 100 generates emulator 126 in the scene where game program 118 adapted to multi-person play is selected (step S104). In other words, the scene where execution of game program 118 with emulator 126 is started may be a scene where selection as to which of a plurality of game programs 118 is to be started is made.

After step S104 is performed, game device 100 operates as the host, and hence it waits for a request for participation from another player. For example, when another game device 100 issues a request for participation of another player (who operates another game device 100) in multi-person play based on communication, game device 100 allows another player to participate in multi-person play so long as timing of request is before start of execution of game program 118, such as timing immediately after step S104.

More specifically, when game device 100 receives the request for participation from another player (YES in step S106), it shares a screen showing a list of executable game programs 118 with another game device 100 that has transmitted the request for participation (step S108). Game device 100 additionally generates emulator 126 corresponding to game device 100 that has transmitted the request for participation and establishes connection 144 that simulates the communication cable between generated emulators 126 (step S110)

Though not clearly shown in FIG. 9, when game device 100 receives a request for leave from another player, it releases emulator 126 corresponding to game device 100 that has transmitted the request for release and updates connection 144 between emulators 126.

Game device 100 with which the screen showing the list of executable game programs 118 is shared becomes game device 100 that participates in multi-person play. The screen showing the list may be shared by transmission of screen data itself from the host to the guest or generation of the screen showing the list in each of game devices 100 that function as the guests upon reception of information on selection of game program 118 from the host.

Figure 13:
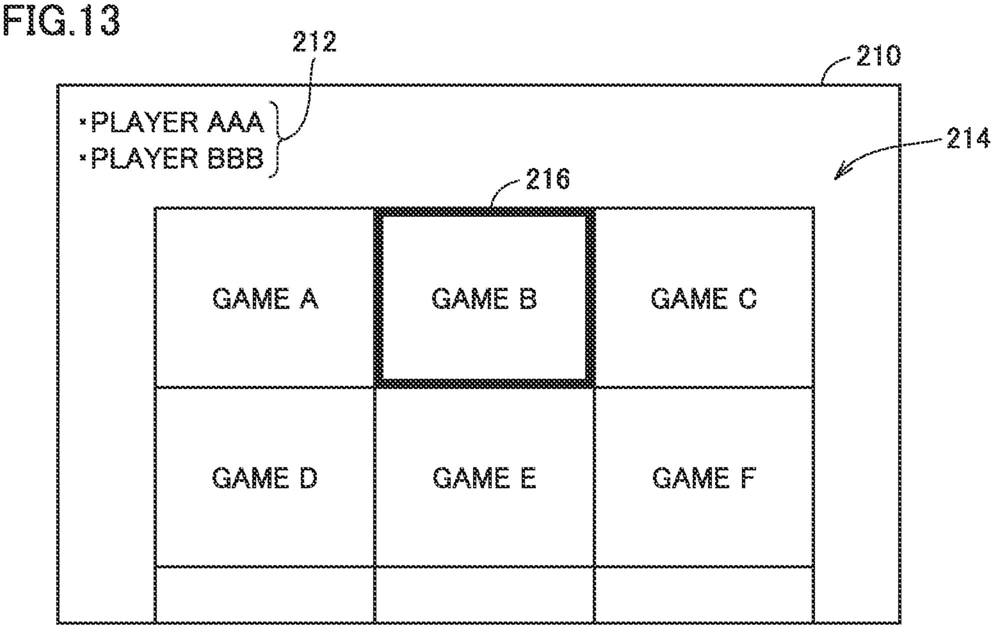
FIG. 13 shows an exemplary illustrative non-limiting drawing illustrating a user interface screen for acceptance of selection of a game program to be executed, by the game device according to the present embodiment.

FIG. 13 is a schematic diagram showing an exemplary user interface screen 210 for acceptance of selection of a game program to be executed by game device 100 according to the present embodiment. Referring to FIG. 13, user interface screen 210 includes participating player representation 212 that shows a currently participating player and representation 214 of a list of game programs 118.

The player as the host can select game program 118 to be executed, by performing an operation for selection in user interface screen 210. An object 216 indicating selection is shown as being superimposed on selected game program 118.

Referring again to FIG. 9, when there is no request for participation from another player (NO in step S106), processing in steps S108 and S110 is skipped.

Game device 100 is in a state in which it waits for selection of game program 118 by the player who operates game device 100 itself. When the player selects a game program 118 (YES in step S112), game device 100 shows an object for identifying selected game program 118 (step S114). Game device 100 that operates as the host thus selects one of game programs 118 adapted to multi-person play in response to an operation by the player. In other words, game program 118 adapted to multi-person play that is to be executed may be one of a plurality of game programs 118 adapted to multi-person play.

When the player has selected none of game programs 118 (NO in step S112), processing in step S114 is skipped.

In succession, game device 100 determines whether or not it is instructed to start execution of game program 118 (step S116). When the game device is not instructed to start execution of game program 118 (NO in step S116), processing in step S106 and later is repeated.

When game device 100 is instructed to start execution of game program 118 (YES in step S116), processing in step S118 and later is performed. In step S118, game device 100 proceeds with multi-person play of game program 118 with emulator 126 based on communication between/among game devices 100 of players who participate in multi-person play.

On the other hand, when game device 100 is instructed to operate as the guest ("guest" in step S100) by a player, it shows on display 106, a list of another game device 100 that operates as the host and a corresponding player (step S120). Game device 100 then waits for selection of another game device 100 (or a corresponding player) by the player who operates game device 100.

When the player selects another game device 100 (or a corresponding player) (YES in step S122), game device 100 determines whether or not game program 118 is being executed in selected game device 100 (step S124).

When game program 118 is being executed in selected game device 100 (YES in step S124), a message that game program 118 is being executed is shown (step S126). Processing in step S124 and later is then repeated.

Figure 14:
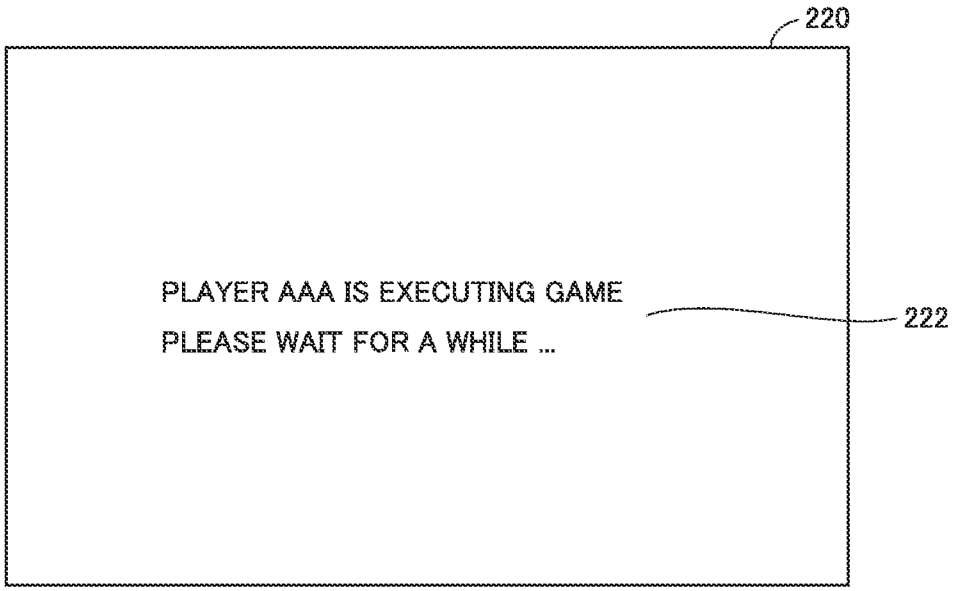
FIG. 14 shows an exemplary illustrative non-limiting drawing illustrating a user interface screen for the game device according to the present embodiment to give a notification that a game program is being executed in a selected host.

FIG. 14 is a schematic diagram showing an exemplary user interface screen 220 for game device 100 according to the present embodiment to give a notification that game program 118 is being executed in the selected host. Referring to FIG. 14, user interface screen 220 includes a message 222 indicating that game program 118 is currently being executed in the selected host.

Game device 100 that operates as the host thus allows, when another game device 100 (that operates as the guest) issues a request for participation of another player in multi-person play, a state that another player has not participated in multi-person play to continue while game program 118 is being executed. Game device 100 that operates as the guest provides, when it transmits the request for participation in multi-person play to another game device 100 (that operates as the host), representation (user interface screen 220) for having the player wait for play until it is allowed by another game device 100 to participate in multi-person play. With such representation, the player can be prevented from losing a motivation to participate in multi-person play.

Referring again to FIG. 9, when game program 118 is not being executed in selected game device 100 (NO in step S124), game device 100 shares the screen showing the list of executable game programs 118 with selected game device 100 (step S128). Game device 100 generates emulators 126 corresponding to respective game devices 100 that have already participated in multi-person play and establishes connection 144 that simulates the communication cable between generated emulators 126 (step S130).

Game device 100 that operates as the host thus allows, when another game device 100 (that operates as the guest) issues a request for participation of another player in multi-person play and transition to a scene where execution of game program 118 with emulator 126 is started has been made (NO in step S124), another player to participate in multi-person play. In processing in step S124, communication between game device 100 that operates as the host and game device 100 that operates as the guest is maintained. The number of emulators 126 generated in each of game devices 100 varies with variation in number of players (game devices 100) who participate in multi-person play. Therefore, when another player participates in multi-person play, in each of game devices 100, multi-person play based on the emulator corresponding to that game device 100 and the emulator corresponding to another game device is made.

In succession, game device 100 determines whether or not it is instructed to start execution of game program 118 (step S132). When the game device is not instructed to start execution of game program 118 (NO in step S132), processing in step S132 and later is repeated.

When the game device is instructed to start execution of game program 118 (YES in step S132), processing in step S118 and later is performed.

In step S118, game device 100 starts execution of selected game program 118 with generated emulator 126. In other words, in game device 100, all generated emulators 126 (as many as the players who participate in multi-person play) each start execution of game program 118. Each of game devices 100 that participate in multi-person play starts execution of game program 118.

Referring to FIG. 10, game device 100 determines whether or not the player has operated operation portion 108 (step S140). When the player has operated operation portion 108 (YES in step S140), game device 100 generates player operation information 150 and transmits player operation information 150 to another game device 100 (step S142). Game device 100 transmits to another game device 100, player operation information 150 indicating an operation input onto game device 100 itself by the player.

When the player has not operated operation portion 108 (NO in step S140), processing in step S142 is skipped.

Game device 100 then determines whether or not it has received player operation information 150 from another game device 100 (step S144). When game device 100 has received player operation information 150 from another game device 100 (YES in step S144), received player operation information 150 is stored in game device 100 (step S146). Game device 100 thus obtains from another game device 100, player operation information 150 indicating an operation input by another player. The number of other game devices 100 to which player operation information 150 is transmitted and from which player operation information 150 is obtained varies depending on the number of players who participate in multi-person play.

When the game device has not received player operation information 150 from another game device 100 (NO in step S144), processing in step S146 is skipped.

Game device 100 executes game program 118 with each emulator 126 based on the player operation information and shared data 142 (step S148). More specifically, game device 100 executes game program 118 with emulator 126 corresponding to game device 100 itself, based on the operation by the player onto game device 100 itself. Concurrently, game device 100 executes game program 118 with each emulator 126 corresponding to another game device 100, based on player operation information 150 obtained from another game device 100.

Game device 100 transmits and receives shared data 142 between emulators 126 based on a result of execution with each emulator 126 (step S150). Game device 100 thus proceeds with multi-person play by transmitting and receiving (or updating) shared data 142 between emulator 126 corresponding to game device 100 itself and emulator 126 corresponding to another game device 100.

Game device 100 outputs to display 106, a game screen obtained as a result of execution of game program 118 with emulator 126 (step S152). Normally, game device 100 outputs to display 106, an image (game screen) of game program 118 executed with emulator 126 corresponding to game device 100 itself.

Each of game devices 100 thus executes game program 118 adapted to multi-person play with a plurality of emulators 126 while it communicates with another game device 100.

Referring to FIG. 11, game device 100 determines whether or not screen sharing is instructed in at least one game device 100 that participates in multi-person play (step S160).

When screen sharing is instructed in at least one game device 100 (YES in step S160), game device 100 shows thereon, a game screen shown on game device 100 where the instruction for screen sharing has been given (step S162). Details of processing involved with screen sharing will be described later. When screen sharing is not instructed (NO in step S160), processing in step S162 is skipped.

Game device 100 determines whether or not an instruction to prematurely terminate game program 118 has been given in at least one game device 100 that participates in multi-person play (step S164). More specifically, each of game devices 100 determines whether or not it is instructed to terminate game program 118 and whether or not it has received a request to terminate game program 118 from another player through communication.

When game device 100 has not been instructed to prematurely terminate game program 118 (NO in step S164), it determines whether or not execution of game program 118 has been completed (step S166). When execution of game program 118 has not been completed (NO in step S166), execution of game program 118 continues and processing in step S160 and later is repeated.

When execution of game program 118 has been completed (YES in step S166), the process returns to step S106.

When the instruction to prematurely terminate game program 118 has been given (YES in step S164), processing as in steps S168 and S170 is performed.

More specifically, game device 100 temporarily suspends execution of game program 18 in emulator 126 (step S168) and shows a screen for obtaining agreement to premature termination of game program 118 (step S170). Game device 100 is thus in a state that it waits for an operation input from each player who participates in multi-person play.

Figure 15:
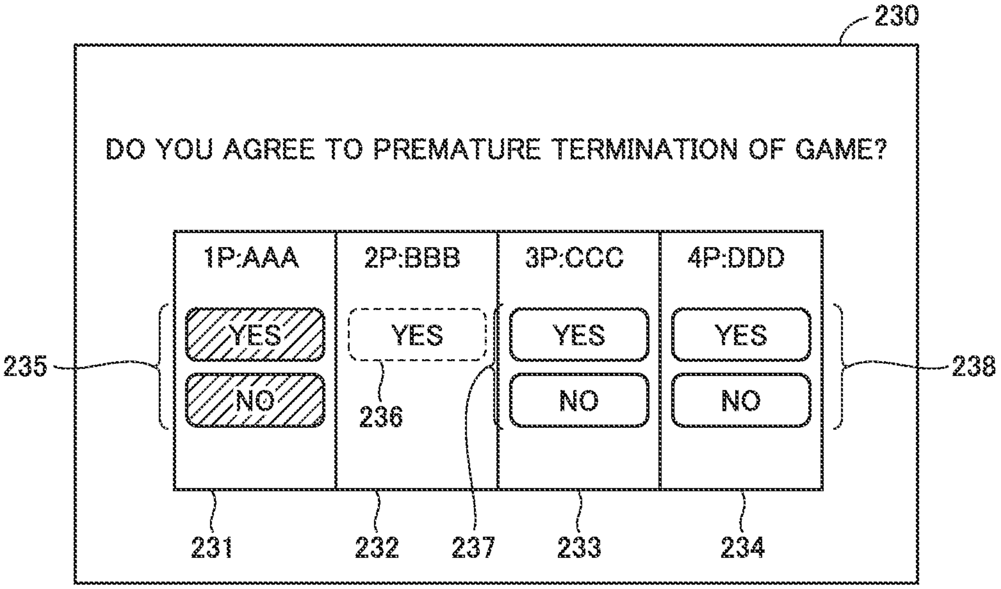
FIG. 15 shows an exemplary illustrative non-limiting drawing illustrating a user interface screen for the game device according to the present embodiment to accept agreement by a player, to premature termination of the game program that is being executed.

FIG. 15 is a schematic diagram showing an exemplary user interface screen 230 for game device 100 according to the present embodiment to accept agreement by a player to premature termination of a game program that is being executed. Referring to FIG. 15, user interface screen 230 includes play-by-player representations 231 to 234 showing states of all players who participate in multi-person play. The number of play-by-player representations is the same as the number of players who participate in multi-person play.

FIG. 15 shows an example in which a player BBB (2P) has given an instruction for premature termination of game program 118. Therefore, in play-by-player representation 232 of player BBB (2P), a state representation 236 indicating "already agreed" is given. A manner of representation may be such that, after the instruction for premature termination is given, whether or not to agree to premature termination can again be selected.

FIG. 15 shows exemplary representation in game device 100 operated by a player AAA (1P). Therefore, in play-by-player representation 231 of player AAA (1P), a state representation 235 that allows the player to select whether or not to agree is provided.

In play-by-player representations 233 and 234 of other players CCC (3P) and DDD (4P), state representations 237 and 238 showing what is selected by each player are given.

Referring again to FIG. 11, when all players who participate in multi-person play agree to premature termination of execution of game program 118 (YES in step S172), game device 100 has data saved, the data being data necessary for game program 118 that is being executed (step S174). The process then returns to step S106.

Thus, during multi-person play, when game device 100 is instructed to quit the game (by the player thereof) or when game device 100 receives a request to quit the game from another player based on communication, game device 100 thus temporarily suspends the game, and when game devices 100 of all players who participate in multi-person play give instructions to quit the game, game device 100 terminates game program 118.

Game device 100 then makes transition to a scene for selection of game program 118 adapted to multi-person play. In other words, when game devices 100 of all players who participate in multi-person play give the instruction to quit the game and game program 118 is terminated, game device makes transition to the scene where selection as to which of the plurality of game programs 118 is to be started is made.

Since emulator 126 and connection 140 are maintained in each of game devices 100, also after transition to the scene for selection of game program 118 adapted to multi-person play, players who have participated in multi-person play of terminated game program 118 are maintained in a state that they are able to participate in multi-person play. In other words, when game devices 100 of all players who participate in multi-person play give the instruction to quit the game and game program 118 is terminated, game device 100 makes transition to the scene for making selection as to which of the plurality of game program 118 is to be started, with the state that players have participated in multi-person play being maintained.

In contrast, unless all players who participate in multi-person play agree to premature termination of execution of game program 118 (NO in step S172), execution of game program 118 is resumed and continues, and processing in step S140 and later is repeated.

F. Modification of Processing Procedure in Execution of Game Program

In the processing procedure shown in FIGS. 9 to 11, before premature termination of execution of game program 118, necessary data is saved (step S174). Depending on specifications of game program 118, the data does not have to be saved in some cases. In such a case, step S174 in FIG. 11 can be skipped.

When data does not have to be saved, execution of game program 118 may prematurely be terminated without agreement by all players. In this case, processing in step S170 in FIG. 11 can be skipped. In other words, when at least one player gives an instruction to prematurely terminate game program 118, execution of game program 118 may prematurely be terminated as it is. In order to allow another player to know a status, each player may be notified of a name of a player who has given the instruction for premature termination and the fact of premature termination of game program 118 in response to the given instruction for premature termination.

G. Screen Sharing

Processing involved with screen sharing (step S162 in FIG. 11) will now be described.

FIG. 16 is a schematic diagram showing an exemplary user interface screen 240 provided in a screen sharing mode by game device 100 according to the present embodiment.

Game device 100 may select the screen sharing mode as shown in FIG. 16, in addition to a normal representation mode in which a game screen generated as a result of execution of game program 118 is shown. For example, in response to an operation onto a specific push button, switching between the normal representation mode and the screen sharing mode may alternately be made.

Figure 16A:
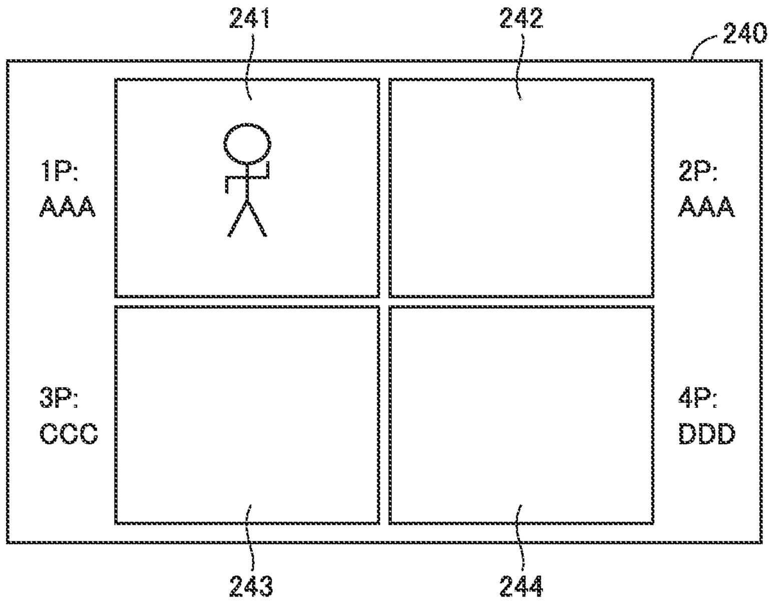
FIGS. 16A and 16B show exemplary illustrative non-limiting drawings each illustrating a user interface screen provided by the game device according to the present embodiment in a screen sharing mode.
Figure 16B:
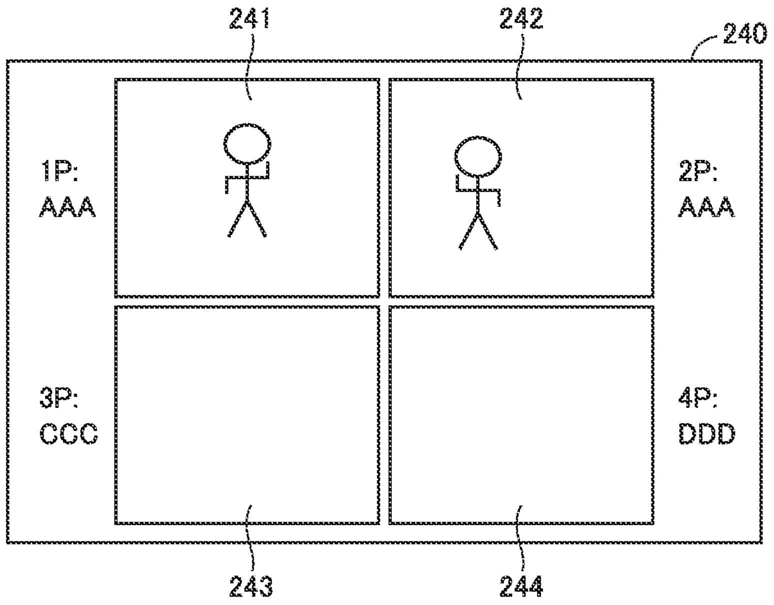

FIG. 16A shows a state in which player AAA (1P) gives an instruction to share the screen and FIG. 16B shows a state in which player BBB (2P) in addition to player AAA (1P) gives an instruction to share the screen.

Referring to FIG. 16A, user interface screen 240 includes representation areas 241 to 244 set for each player (game device 100). In the example shown in FIG. 16A, player AAA (1P) has given the instruction to share the screen, and therefore a game screen generated as a result of execution of game program 118 by game device 100 operated by player AAA (1P) is shown.

In the example shown in FIG. 16B, since player BBB (2P) has given the instruction to share the screen, in addition to the game screen shown in FIG. 16A, a game screen generated as a result of execution of game program 118 by game device 100 operated by player BBB (2P) is shown.

In each of game devices 100, game program 118 is executed with emulator 126 corresponding to another game device 100. Therefore, a game screen generated by emulator 126 corresponding to game device 100, screen sharing with which has been instructed, is additionally outputted. Therefore, game devices 100 do not have to transmit and receive the game screen itself therebetween/thereamong.

In game system 1 according to the present embodiment, players can participate in multi-person play even though they are distant from each other unlike the example where the conventional physical communication cable is used. In multi-person play by the players located at remote locations, however, the players are unable to show game screens to each other. In order to address such a problem, by providing the screen sharing mode, even when a plurality of players participate in multi-person play while they are physically distant from each other, they can mutually know statuses of the game.

H. Advantage

According to the present embodiment, a scheme to suppress an unexpected operation such as forced termination even on the occurrence of cut-off of communication in implementation through communication, of multi-person play of a game program (in the past) not intended for multi-person play through communication is provided.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. A non-transitory computer-readable storage medium with an executable information processing program stored thereon, the information processing program causing a computer of an information processing apparatus to perform:

communicating with another information processing apparatus;

executing a game program adapted to multi-person play with a first emulator based on an operation input;

transmitting data on the operation input to the another information processing apparatus;

outputting to a display, an image of a game executed with the first emulator;

obtaining data on an operation input provided by another player from the another information processing apparatus;

executing the game program with a second emulator based on the obtained operation input by the another player; and proceeding with multi-person play of the game by transmission and reception between the first emulator and the second emulator, of data defined as data to be transmitted and received in multi-person play of the game program.

2. The non-transitory computer-readable storage medium according to claim 1, wherein when the another information processing apparatus issues a request for participation of the another player in the multi-person play, the computer is caused to perform allowing a state that the another player has not participated in the multi-person play to continue while the game program is being executed, and allowing the another player to participate in the multi-person play and proceeding with multi-person play based on the first emulator and the second emulator when transition to a scene where execution of the game program with the first emulator is started is made, and during the multi-person play, the computer is caused to perform temporarily suspending the game when an instruction to quit the game is given or when a request to quit the game is given from another player based on communication, and terminating the game program when an instruction to quit the game is given from information processing apparatuses of all players who participate in the multi-person play.

3. The non-transitory computer-readable storage medium according to claim 2, wherein the game program adapted to the multi-person play is at least one of a plurality of game programs adapted to multi-person play, and the scene where execution of the game program with the first emulator is started is a scene where selection as to which of the plurality of game programs is to be started is made.

4. The non-transitory computer-readable storage medium according to claim 3, wherein
when the instruction to quit the game is given from the information processing apparatuses of all players who participate in the multi-person play and the game program is terminated, the computer is caused to perform making transition to the scene where selection as to which of the plurality of game programs is to be started is made.

5. The non-transitory computer-readable storage medium according to claim 4, wherein
when the instruction to quit the game is given from the information processing apparatuses of all players who participate in the multi-person play and the game program is terminated, the computer is caused to perform making transition to the scene where selection as to which of the plurality of game programs is to be started is made, with a state that players have participated in the multi-person play being maintained.

6. A game system comprising:
a plurality of information processing apparatuses, each of the plurality of information processing apparatuses comprising a processor, wherein
the processor of each of the plurality of information processing apparatuses
establishes communication between/among the plurality of information processing apparatuses,
executes a game program adapted to multi-person play with a plurality of emulators as many as the number of participants in multi-person play,
executes the game program with a first emulator based on an operation input provided by a player,
transmits data on the operation input by the player to another information processing apparatus of the information processing apparatuses,
outputs to a display, an image of a game executed with the first emulator,
obtains data on an operation input by another player from the another information processing apparatus,
executes the game program with an emulator other than the first emulator based on the obtained operation input by the another player, and
proceeds with multi-person play of the game by transmission and reception between/among the plurality of emulators, of data defined as data to be transmitted and received in multi-person play of the game program.

7. The game system according to claim 6, wherein
when another information processing apparatus issues a request for participation of another player in the multi-person play, the processor of each of the plurality of information processing apparatuses
allows a state that the another player has not participated in the multi-person play to continue while the game program is being executed, and
allows the another player to participate in the multi-person play and executes the plurality of emulators as many as the number of participants in the multi-person play to proceed with multi-person play based on the first emulator and another emulator when transition to a scene where execution of the game program with the first emulator is started is made.

8. The game system according to claim 7, wherein
during the multi-person play, the processor of each of the plurality of information processing apparatuses
temporarily suspends the game when an instruction to quit the game is given or when a request to quit the game is given from another player based on communication, and
terminates the game program when an instruction to quit the game is given from information processing apparatuses of all players who participate in the multi-person play.

9. The game system according to claim 8, wherein
the game program adapted to the multi-person play is at least one of a plurality of game programs adapted to multi-person play, and
the scene where execution of the game program with the first emulator is started is a scene where selection as to which of the plurality of game programs is to be started is made.

10. The game system according to claim 9, wherein
when the instruction to quit the game is given from the information processing apparatuses of all players who participate in the multi-person play and the game program is terminated, the processor of each of the plurality of information processing apparatuses causes transition to the scene where selection as to which of the plurality of game programs is to be started is made.

11. The game system according to claim 10, wherein
when the instruction to quit the game is given from the information processing apparatuses of all players who participate in the multi-person play and the game program is terminated, the processor of each of the plurality of information processing apparatuses causes transition to the scene where selection as to which of the plurality of game programs is to be started is made, with a state that players have participated in the multi-person play being maintained.

12. A game device comprising a processor, wherein
the processor of the game device
executes a game program adapted to multi-person play with a first emulator based on an operation input,
transmits data on the operation input to another game device,
outputs to a display, an image of a game executed with the first emulator,
obtains data on an operation input by another player from the another game device,
executes the game program with a second emulator based on the obtained operation input by the another player, and
proceeds with multi-person play of the game by transmission and reception between the first emulator and the second emulator, of data defined as data to be transmitted and received in multi-person play of the game program.

13. The game device according to claim 12, wherein
when the another game device issues a request for participation of the another player in the multi-person play, the processor of the game device
allows a state that the another player has not participated in the multi-person play to continue while the game program is being executed, and
allows the another player to participate in the multi-person play and proceeds with multi-person play based on the first emulator and the second emulator when transition to a scene where execution of the game program with the first emulator is started is made, and
during the multi-person play, the processor of the game device further temporarily suspends the game when an instruction to quit the game is given or when a request to quit the game is given from another player based on communication, and terminates the game program when an instruction to quit the game is given from game devices of all players who participate in the multi-person play.

14. The game device according to claim 13, wherein the game program adapted to the multi-person play is at least one of a plurality of game programs adapted to multi-person play, and the scene where execution of the game program with the first emulator is started is a scene where selection as to which of the plurality of game programs is to be started is made.

15. The game device according to claim 14, wherein when the instruction to quit the game is given from the game devices of all players who participate in the multi-person play and the game program is terminated, the processor of the game device causes transition to the scene where selection as to which of the plurality of game programs is to be started is made.

16. The game device according to claim 15, wherein when the instruction to quit the game is given from the game devices of all players who participate in the multi-person play and the game program is terminated, the processor of the game device causes transition to the scene where selection as to which of the plurality of game programs is to be started is made, with a state that players have participated in the multi-person play being maintained.

17. An information processing method comprising:

executing, by a processor of a game device, a game program adapted to multi-person play with a first emulator based on an operation input;

transmitting, by the processor, data on the operation input to another game device;

outputting to a display, by the processor, an image of a game executed with the first emulator;

obtaining, by the processor, data on an operation input provided by another player from the another game device;

executing, by the processor, the game program with a second emulator based on the obtained operation input by the another player; and proceeding, by the processor, with multi-person play of the game by transmission and reception between the first emulator and the second emulator, of data defined as data to be transmitted and received in multi-person play of the game program.

18. The information processing method according to claim 17, wherein when the another game device issues a request for participation of the another player in the multi-person play, the processor allows a state that the another player has not participated in the multi-person play to continue while the game program is being executed, and allows the another player to participate in the multi-person play and proceeds with multi-person play based on the first emulator and the second emulator when transition to a scene where execution of the game program with the first emulator is started is made, and during the multi-person play, the processor further temporarily suspends the game when an instruction to quit the game is given or when a request to quit the game is given from another player based on communication, and terminates the game program when an instruction to quit the game is given from game devices of all players who participate in the multi-person play.

19. The information processing method according to claim 18, wherein the game program adapted to the multi-person play is at least one of a plurality of game programs adapted to multi-person play, and the scene where execution of the game program with the first emulator is started is a scene where selection as to which of the plurality of game programs is to be started is made.

20. The information processing method according to claim 19, wherein when the instruction to quit the game is given from the game devices of all players who participate in the multi-person play and the game program is terminated, the processor further causes transition to the scene where selection as to which of the plurality of game programs is to be started is made.

21. The information processing method according to claim 20, wherein when the instruction to quit the game is given from the game devices of all players who participate in the multi-person play and the game program is terminated, the processor further causes transition to the scene where selection as to which of the plurality of game programs is to be started is made, with a state that players have participated in the multi-person play being maintained.

* * * * *